United States Patent [19]

Nagahori

[11] Patent Number: 5,092,275
[45] Date of Patent: Mar. 3, 1992

[54] EXERCISE APPARATUS FOR DOGS

[76] Inventor: Koichi Nagahori, 2-26-7, Higashitamagawa, Setagaya-Ku, Tokyo, Japan

[21] Appl. No.: 654,666

[22] Filed: Feb. 12, 1991

[51] Int. Cl.⁵ ............................................. A01K 5/00
[52] U.S. Cl. .................................... 119/57.92; 119/29
[58] Field of Search ................ 119/29, 51.11, 57.92, 119/57.6, 61; 446/444, 455, 118; 104/120

[56] References Cited

U.S. PATENT DOCUMENTS

| | | | |
|---|---|---|---|
| 1,379,224 | 5/1921 | Smith | 119/15.1 X |
| 1,835,346 | 12/1931 | Smith | 119/15.1 X |
| 1,965,287 | 7/1934 | Heintz | 119/15.1 X |
| 2,376,028 | 5/1945 | Buck | 119/61 |
| 3,099,248 | 7/1963 | Giles et al. | 119/29 |
| 3,379,138 | 4/1968 | Lindstrom | 446/444 X |

FOREIGN PATENT DOCUMENTS

| | | | |
|---|---|---|---|
| 442679 | 11/1948 | Italy | 446/455 |
| 6513782 | 1/1967 | Netherlands | 446/455 |

Primary Examiner—Gene Mancene
Assistant Examiner—R. Thomas Price
Attorney, Agent, or Firm—Wenderoth, Lind & Ponack

[57] ABSTRACT

An exercise apparatus is disclosed for use in exercising dogs indoors. The apparatus includes an endless monorail mounted on a base plate. An electric self-propelled travelling body is detachably installed over the monorail in such a manner that it straddles the monorail. On the outer side of this self-propelled travelling body, a feeder supporting part is mounted so as to extend outwardly. On this feeder supporting part, a feeder table is mounted detachably, and once a dog treat is placed on this feeder table and the self-propelled travelling body is started, the dog will run after the bait as it moves along the monorail.

12 Claims, 4 Drawing Sheets

EXERCISE APPARATUS FOR DOGS

BACKGROUND OF THE INVENTION

The present invention relates to an exercise apparatus for dogs, particularly suitable for those small-sized toy dogs like dachshunds, poodles, Maltese dogs, and Chihuahuas.

When one keeps a dog, it is one of the keeper's indispensable duties to give his dog outdoor exercise for its health. However, sometimes the keeper finds it difficult to exercise his dog due to bad weather, such as, rain or due to other commitments. Moreover, in today's urban areas there rarely exist places fit for exercising one's dog, and even if the keeper can find such places, next come such worries as how to sweep his pet's feces or how to watch his dog lest it should bite or cause harm to passersby.

It has been long desired to develop an apparatus with which one can easily give his toy dog indoor exercise. One known arrangement of this type is disclosed in Toku Ko Sho 56-43204 (the Japanese Patent Publication No. 56-43204). In this previous arrangement, a pair of pulleys is mounted on a collapsible circuit which serves as a track for a dog to run around, an endless belt or chain is mounted about this pair of pulleys. The dog is induced to run by leashing the dog or attaching something which attracts the dog's attention to the belt or chain.

However, this prior art apparatus requires a device to rotate and move a belt employing a pair of pulleys or a device to rotate and move a chain, thus resulting in a heavy and big apparatus which is inconvenient for indoor use. Furthermore, the prior art apparatus is expensive to manufacture, requires time and labor in assembly and disassembly together with troublesome maintenance and care after use.

Objects of the present invention are to solve said problems of the prior art apparatus and to provide an exercise apparatus for dogs which is fit for indoor use, is light in weight and small in size, and is easy to maintain and care for after use.

BRIEF SUMMARY OF THE INVENTION

To achieve the above objects, the present invention proposes a structure comprising an endless monorail, an electric self-propelled travelling body which travels guided by the monorail, and a guidance body placed on the self-propelled travelling body. Preferably the monorail is set on a base plate in a loop-shaped manner and the self-propelled travelling body guided by the monorail straddling over the upper part thereof has a feeder supporting part on the outer side, and a feeder, which is a guidance body, is detachably mounted on the feeder supporting part. A preferred structure of the self-propelled travelling body comprises of a driving wheel which rotates and moves on the upper surface of the monorail, a motor as a driving source for this driving wheel, and collecting shoes to supply power to the motor, with power supplying rails to be in contact with these collecting shoes to be positioned on the base plate along the monorail. More preferably, the base plate and the monorail are divided into two parts and folded with hinges set on the partition part of the base plate.

BRIEF DESCRIPTION OF THE DRAWINGS

An embodiment of the present invention is shown in FIGS. 1 through 8.

DETAILED DESCRIPTION OF THE INVENTION

Figure 1:
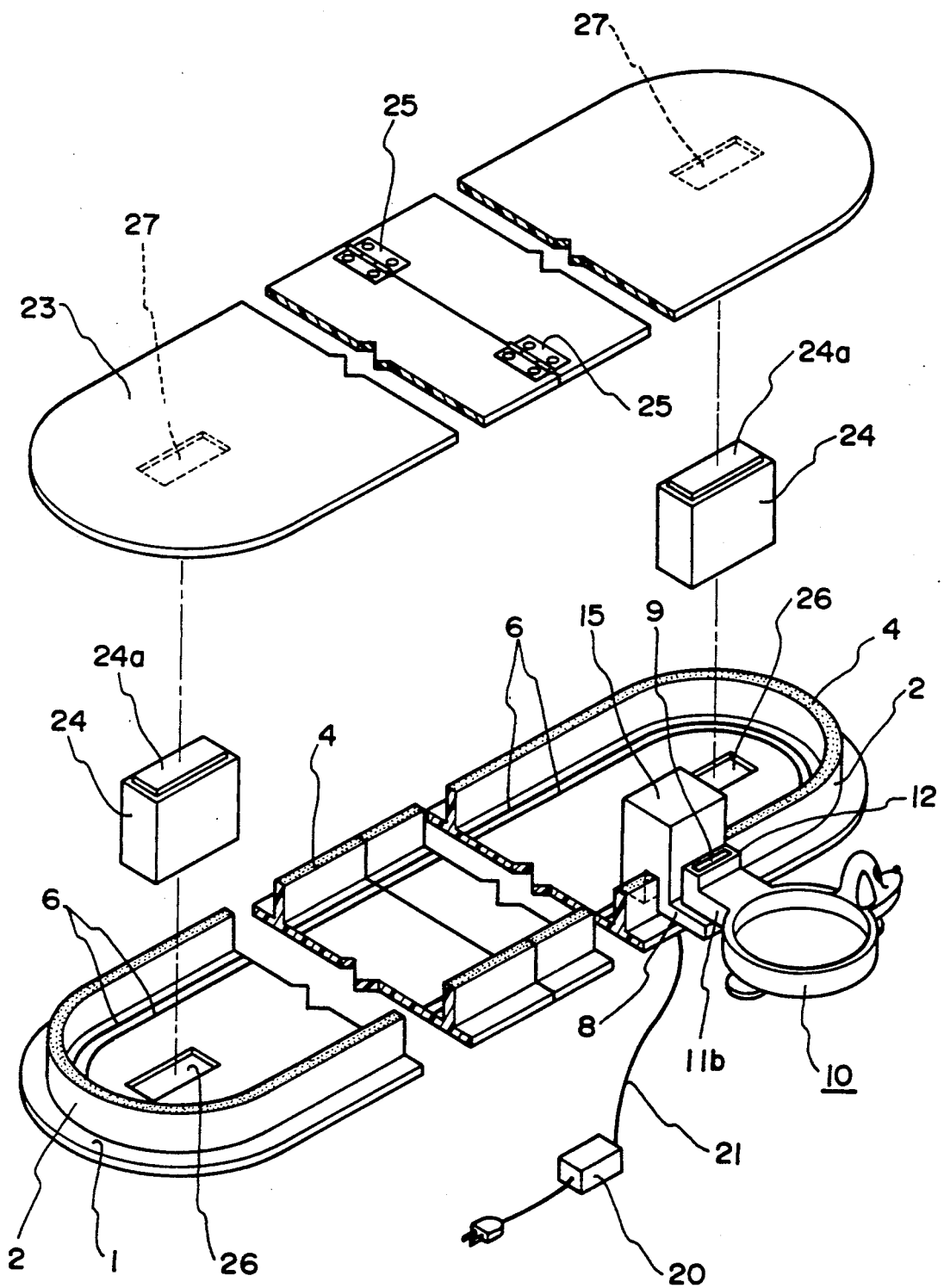
FIG. 1 is an exploded perspective view of an exercise apparatus according to the invention, with parts thereof omitted for clarity.
Figure 2:
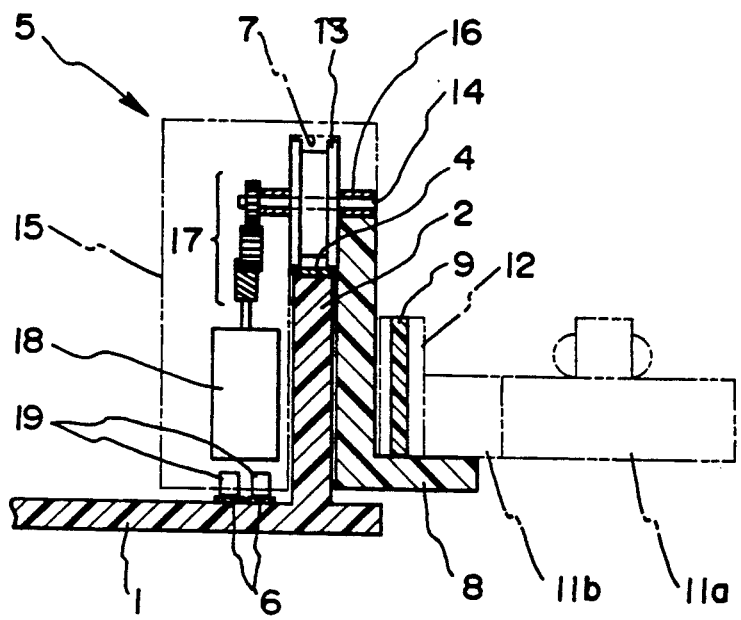
FIG. 2 is a sectional view of a portion of the apparatus with a self-propelled travelling body straddling over a monorail mounted on a base plate.

As shown in FIGS. 1 and 2, an annular monorail 2 is fixed on a base plate 1 made of synthetic resin. Any rigid plate material with relatively light weight will suffice for this base plate 1. For example, plywood or corrugated cardboard can be used for the base plate. In case, however, that those plate materials are used, the monorail 2 is to be formed separately from the base plate 1 and is to be fixed on the base plate 1 by suitable means such as bonding material.

Figure 3:
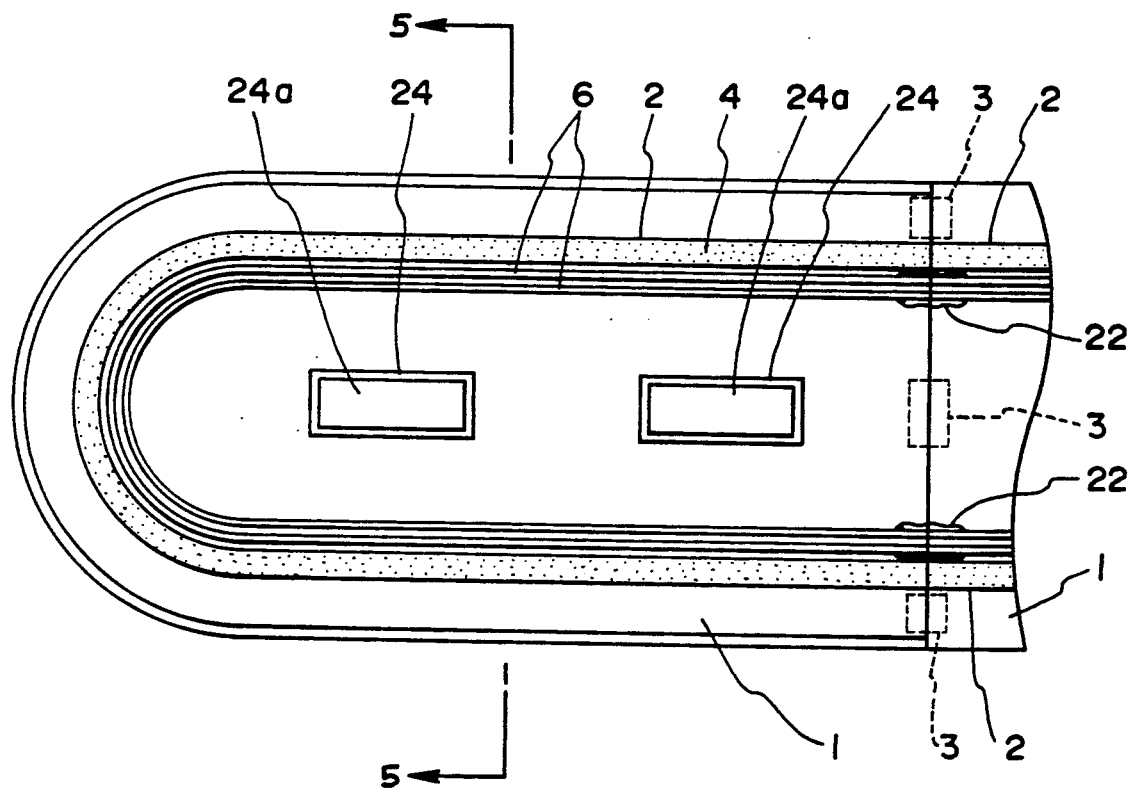
FIG. 3 is a top view showing part of the base plate and the monorail.
Figure 4:
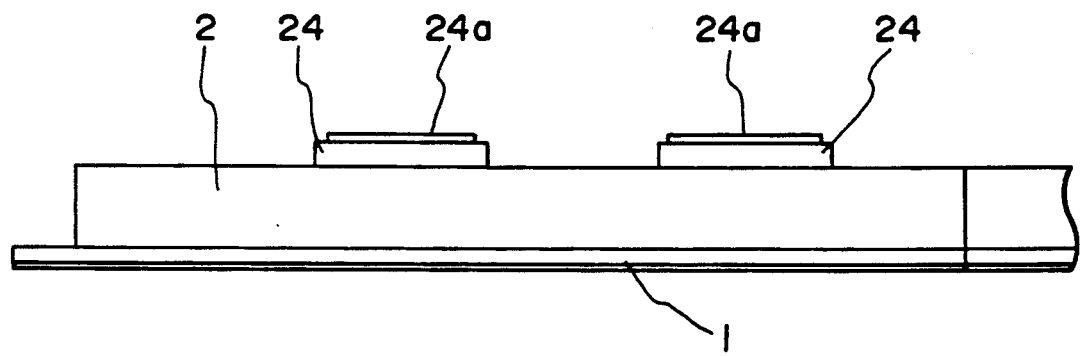
FIG. 4 is a side view of the same.
Figure 5:
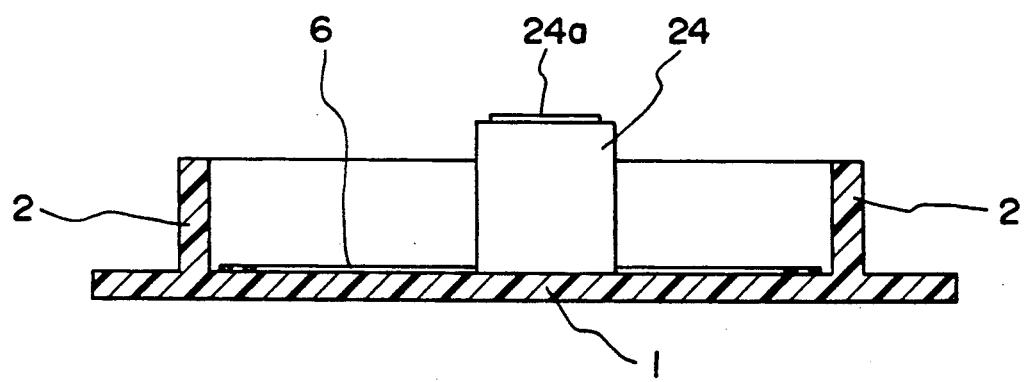
FIG. 5 is a sectional view taken along the line A—A of FIG. 3.

Preferably the base plate 1 and the monorail 2 are composed so as to be foldable or disassembeable into plural parts, when they are not in use. In this embodiment, as shown in FIG. 3, the base plate 1 and the monorail 2 are in two parts so as to be foldable toward the backside of the base plate 1, by dividing the base plate 1 and the monorail 2 into two parts at the center of the longitudinal direction and providing two bendable hinges 3 on the backside of the base plate 1 at the junction between the two parts.

Though, in this embodiment, the base plate 1 and the monorail 2 are integrally formed by using synthetic resin, the monorail 2 and base plate 1 can be made of synthetic resin and the monorail 2 mounted rigidly on the base plate 1 with bonding material, or the monorail 2 can be detachably mounted with clamps. In this embodiment the monorail 2 is formed in a slender elliptical shape, but it can also be formed in a round shape.

As is apparent from FIG. 2, an electric self-propelled travelling body 5, which is detachably mounted over the monorail 2, includes a frame 15 with a groove 7 formed therein in order to have it straddle over the monorail 2. A driving wheel 13, which runs on a sound absorbing material 4 lined along the top surface of the monorail 2, is rotatably mounted at the upper part of the groove 7. Symbol 16 represents bearing for rotatably suspending an axle 14 of the driving wheel 13. A motor 18, and driving transmission gears 17 connecting the motor 18 with the driving wheel 13, are provided in the frame 15 of the self-propelled travelling body 5 to run the driving wheel 13. The motor 18 is preferably a small and variable motor. In this embodiment, the motor 18 is composed so as to transmit its rotation driving force to the driving wheel 13 after reduction by the transmission gears 17, while the motor 18 can also be composed so as to transmit its rotation driving force to the driving wheel 13 after reduction by a pulley and a belt.

As shown in FIG. 2, two collecting shoes 19 for supplying power to the motor 18 are installed at the lower end of the frame 15. These collecting shoes 19 are positioned so as to be firmly in contact with two power supplying rails 6 which are mounted in parallel on the base plate 1 and inside the monorail 2. As shown in FIG. 1, the power supplying rails 6 are connected with a domestic AC electric source or a battery through a power supplying cord 21 and a controller 20. The controller 20 is operable to control starting and stopping of the motor 18 as well as variation of the speed thereof. The power supplying rails 6 are, as shown in FIG. 3, partitioned in the same manner as the base plate 1 and the monorail 2, and are connected electrically by means of connecting lead wires 22.

Figure 6:
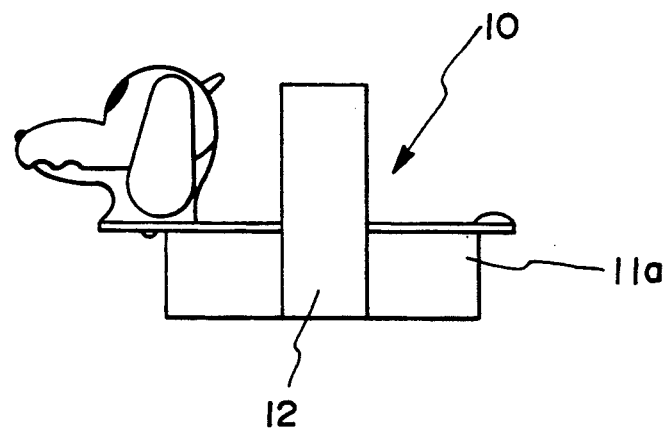
FIG. 6 is a side view of a feeder table.
Figure 7:
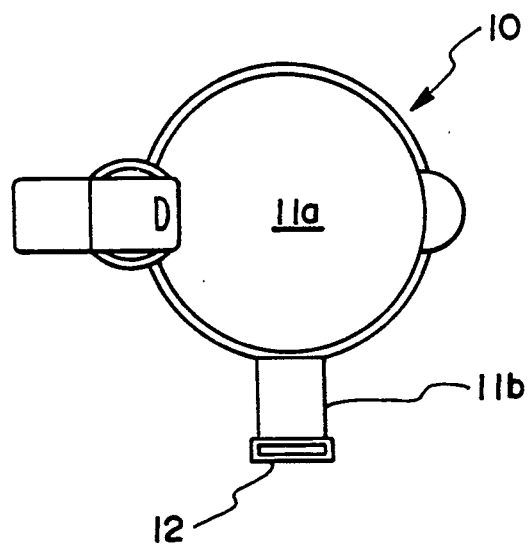
FIG. 7 is a top view of the same.

As shown in FIGS. 1 and 2, a feeder supporting plate 8 for supporting a feeder table 10 is integrally installed at the lower end on the side of the frame 15 such that it is horizontal and protrudes outwardly. A latching boss 9 is mounted on the upper surface of the supporting plate 8. This feeder table 10 composes a guidance body. As is clear from FIGS. 6 and 7, the feeder table 10 is itself composed of a dish-shaped feeder 11a into which a dog's favorite treat or other material which attracts a dog's interest can be filled. A bracket 11b is integrally installed on the side of the feeder 11a. A support part 12, having a hole through which the latching boss 9 is to be inserted, is formed at the end of the bracket 11b and, as shown in FIGS. 11 and 2, the feeder table 10 can be held on the supporting plate 8 installed on the self-propelled travelling body 5 by inserting the latching boss 9 through the hole of the supporting part 12. The feeder table 10, when it requires cleaning after use, can be detached from the self-propelled travelling body 5 by removing the support part 12 from the latching boss 9.

Figure 8:
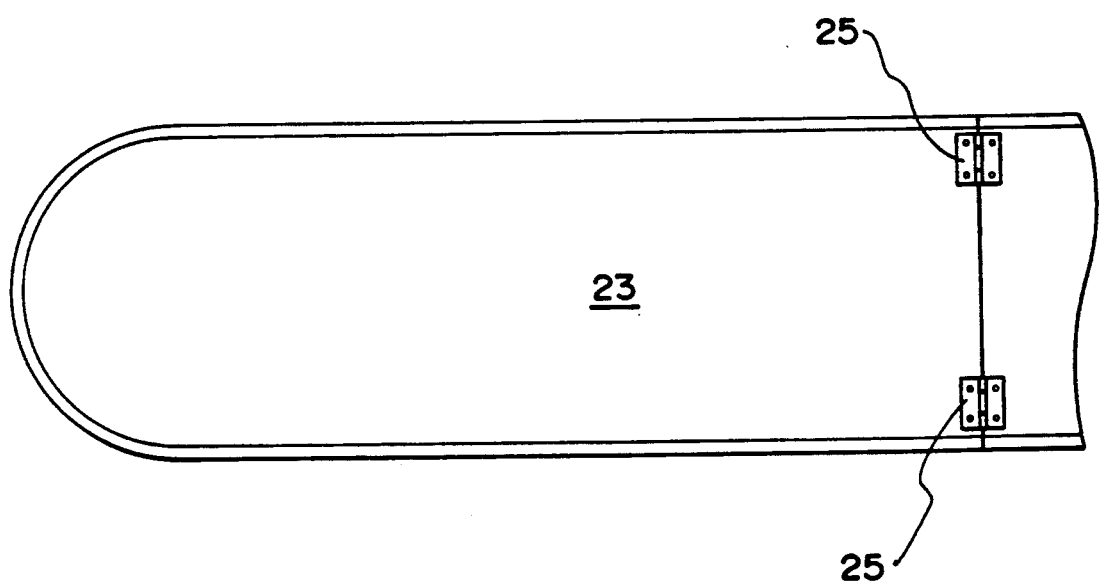
FIG. 8 is a top view showing part of a cover plate.

Symbol 23 in FIGS. 1 and 8 is a cover plate to be set above the base plate 1. This cover plate is fixed detachably on the top ends of four stays 24 (only some of which are shown) which are positioned on the base plate 1, inside the monorail 2, and with their upper ends at a higher level than the top surface of the monorail 2. Each of these stays 24 is fixed firmly on the base plate 1 and the cover plate 23 by putting an insert part 24a provided at the upper and lower ends of each stay into each of dint openings or recesses 26, 27 made in the base plate 1 and the cover plate 23, respectively. As shown in FIG. 8, the cover plate 23 is also composed so as to be foldable by dividing it into two parts at the center of the longitudinal direction and by providing it with two hinges 25.

Now, I would like to explain how to use the foregoing exercise apparatus for dogs, and its effects.

When using this apparatus, first, place the self-propelled travelling body 5 on the monorail 2 in such a manner that this self-propelled travelling body 5 straddles over the monorail 2. The set and fix the cover plate 23 on each of the stays 24, and put a favorite treat of the dog which you wish to exercise, or any other material which attracts the dog's interest, on the feeder 11a. Next, make the dog get near the feeder table 10, actuate the motor 18 and move the feeder table 10 with suitable speed together with the self-propelled travelling body 5 along along the monorail 2. The dog will start running toward the feeder table 10 in order to jump at the treat or the material attracting its interest. By adjusting the speed of the self-propelled travelling body 5 so as to make the speed of the feeder table 10 a little higher than that of the dog's running, you can keep the dog running after the feeder table 10. In this manner, even in a small room, you can easily exercise your dog. After the exercise is completed, remove the cover plate 23 from each of the stays 24, and also remove each of the stays 24 from the base plate 1. Then lift the self-propelled travelling body 5 upward and remove it from the monorail 2, and also remove the feeder table 10 from the supporting plate 8 of the self-propelled travelling body 5. If necessary, you may clean the feeder table 10 at this stage. It is recommended that the base plate 1 and the cover plate 23 b3e folded up by means of the hinges 3 and 25, respectively, and be fastened with a strap.

As is clear from the foregoing explanation, the present invention offers the following effects:

(1) the exercise apparatus for dogs according to this invention is different from the prior art apparatus which is heavy and big resulting from using a belt device with a pair of pulleys or a chain-type traction device, is light and small, and is suitable for indoor use.

(2) To use the apparatus, the method of assembly is very simple, requiring no skill, and easy and quick assembly is possible even for a child. Maintenance and care after use is also easy. Particularly, because cleaning is easy, the apparatus can be kept hygienic.

(3) In addition, by using synthetic resin, manufacturing costs can be kept low.

I claim:

1. An exercise apparatus for use in exercising a dog indoors, comprising:
   a base plate;
   a closed-loop endless monorail mounted on said base plate;
   a travelling body mounted in straddling relation on said monorail for movement along said monorail;
   drive means for propelling said travelling body along said monorail; and
   a feeder table mounted to said travelling body and extending radially outwardly relative to said closed-loop endless monorail, such that when said travelling body is propelled along said monorail, said feeder table is propelled with said travelling body along an outside of said closed-loop endless monorail.

2. An exercise apparatus as recited in claim 1, wherein
   said drive means comprises a driving wheel rotatably mounted to said travelling body and mounted to ride along an upper surface of said monorail, and a motor means operably connected to said driving wheel for driving said driving wheel.

3. An exercise apparatus as recited in claim 2, wherein
   said motor means comprises an electric motor; and
   said drive means further comprises power supply rails mounted on said base plate along said endless monorail, and collecting shoes mounted to said travelling body in such a manner as to be moved along said power supply rails as said travelling body moves along said monorail.

4. An exercise apparatus as recited in claim 1, further comprising
   a feeder supporting part mounted to and extending outwardly from said travelling body so as to extend radially outwardly relative to said monorail; and
   wherein said feeder table is mounted to said feeder supporting part.

5. An exercise apparatus as recited in claim 4, further comprising
   a latching boss mounted to and extending upwardly from said feeder supporting part; and
   wherein said feeder table is provided with a support member having a hole therethrough through which said latching boss is removably inserted to detachably mount said feeder table to said feeder supporting part.

6. An exercise apparatus as recited in claim 1, wherein
   said base plate and said monorail are each divided into at least two sections along a coextensive junction; and
   hinges are provided on said base plate across said junction to hingedly connect said at least two sections of said base plate, such that said base plate and said monorail can be folded.

7. An exercise apparatus as recited in claim 6, further comprising
   a cover plate mounted to said base plate above and in covering relation to said monorail.

8. An exercise apparatus as recited in claim 7, wherein
   said cover plate is divided into at least two sections; and
   hinges are provided on said cover plate to hingedly connect said at least two sections of said cover plate, such that said cover plate can be folded.

9. An exercise apparatus as recited in claim 8, further comprising
   support stays mounted to said base plate and extending upwardly therefrom such that upper ends of said support stays are at a higher level than an upper surface of said monorail; and
   wherein said cover plate is detachably mounted to said upper ends of said support stays.

10. An exercise apparatus as recited in claim 1, further comprising
    a cover plate mounted to said base plate above and in covering relation to said monorail.

11. An exercise apparatus as recited in claim 10, wherein
    said cover plate is divided into at least two sections; and
    hinges are provided on said cover plate to hingedly connect said at least two sections of said cover plate, such that said cover plate can be folded.

12. An exercise apparatus as recited in claim 11, further comprising
    support stays mounted to said base plate and extending upwardly therefrom such that upper ends of said support stays are at a higher level than an upper surface of said monorail; and
    wherein said cover plate is detachably mounted to said upper ends of said support stays.

* * * * *